United States Patent [19]

White, Jr.

[11] Patent Number: 5,178,768
[45] Date of Patent: Jan. 12, 1993

[54] MIXED FILTER BED COMPOSITION AND METHOD OF USE

[75] Inventor: Donald H. White, Jr., Homer, N.Y.

[73] Assignee: Pall Corporation, Glen Cove, N.Y.

[21] Appl. No.: 932,596

[22] Filed: Aug. 20, 1992

[51] Int. Cl.$^5$ .............................................. B01D 15/00
[52] U.S. Cl. .................................... 210/663; 210/694;
210/764; 210/501; 210/502.1; 210/503
[58] Field of Search ............... 210/282, 283, 284, 290,
210/266, 502.1, 503, 504, 505, 506, 508, 509,
510.1, 501, 694, 764, 663, 660; 55/522, 527;
502/413

[56] References Cited

U.S. PATENT DOCUMENTS

| | | | |
|---|---|---|---|
| 3,337,454 | 8/1967 | Gruenwald | 210/694 |
| 3,996,131 | 12/1976 | Conn | 210/651 |
| 4,081,365 | 3/1978 | White et al. | 210/668 |
| 4,116,828 | 9/1978 | Sawyer, Jr. | 210/667 |
| 4,133,759 | 1/1979 | Ikeda et al. | 210/268 |
| 4,238,334 | 12/1980 | Halbfoster | 210/679 |
| 4,257,896 | 3/1981 | Ikeda et al. | 210/268 |
| 4,517,095 | 5/1985 | Ceaser | 210/665 |
| 4,642,192 | 2/1987 | Heskett | 210/757 |
| 4,661,256 | 4/1987 | Johnson | 210/634 |
| 4,687,573 | 8/1987 | Miller et al. | 210/506 |
| 4,725,361 | 2/1988 | Fleming | 210/673 |
| 4,795,735 | 1/1989 | Liu et al. | 210/684 |
| 4,849,095 | 7/1989 | Johnson et al. | 210/694 |
| 4,864,012 | 9/1989 | Britt | 210/676 |
| 4,923,843 | 5/1990 | Saforo et al. | 210/684 |
| 5,019,311 | 5/1991 | Koslow | 210/502.1 |
| 5,112,482 | 5/1992 | Shaub et al. | 210/502.1 |
| 5,118,655 | 6/1992 | Pederson | 210/679 |
| 5,139,668 | 8/1992 | Pan et al. | 210/502.1 |

OTHER PUBLICATIONS

D. W. Breck, "Crystalline Molecular Sieves", Union Carbide Molecular Sieves, Reprinted, With Permission, From Journal of Chemical Education, vol. 48 (Dec., 1964).

W. Strauss, *Industrial Gas Cleaning*, Pergamon Press, New York, Table 37, p. 108.

James W. Neeley and Eric G. Isacoff, *Carbonaceous Adsorbents For The Treatment of Ground and Surface Waters*, Marcel Dekker, Inc., New York, pp. 8–11, and 143.

U.S. Department Of The Interior, Office of Saline Water, *The A–B–Seas of Desalting*, U.S. Government Printing Office, Washington, D.C.

D. White, "Regenerable Pressure-Swing Adsorption Systems For Continuous Chemical Warfare Collective Protection", Presented to the Naval Research Laboratory, Washington, D.C., Apr. 23, 1986, pp. 10–17.

*Primary Examiner*—Stanley S. Silverman
*Assistant Examiner*—Cynthia L. Nessler
*Attorney, Agent, or Firm*—Leydig, Voit & Mayer

[57] ABSTRACT

A mixed filter bed composition for purifying water for human consumption containing inorganic, organic and biological contaminants said composition comprising:
- (a) from about 40% to about 80% by weight of carbonous sorbent;
- (b) from about 5% to about 20% by weight of activated alumina;
- (c) from about 5% to about 20% by weight of silica hydrogel;
- (d) from about 5% to about 20% by weight of zeolite; and
- (e) from about 0% to about 10% by weight of metallic components that generate metallic cations.

The present invention provides potable water free of organic, inorganic and microbial contaminants. The present invention also imparts the desirable filtration characteristics of traditional adsorbents while avoiding increased biological contamination of drinking water during the filtration process.

8 Claims, No Drawings

MIXED FILTER BED COMPOSITION AND METHOD OF USE

FIELD OF THE INVENTION

This invention relates in general to the field of filtering compositions for water purification.

BACKGROUND OF THE INVENTION

Four main categories of contaminants are present in drinking water supplies: organic, microbiological, inorganic, and particulate matter.

It is well known in the field of water purification that particulate matter can be removed by strainers, fibrous filters, sand beds, granular anthracite packed beds, and diatomaceous earth filters. However, the current invention is specifically concerned with the removal of the first three categories of contaminants, which will typically penetrate particulate filters, namely organic and inorganic dissolved compounds and microbes.

Organic compounds present in today's water systems include hydrocarbons such as humic, fulvic and tannic acids, petroleum products such as oil, gasoline and kerosine, and volatile organic compounds ("VOCs") such as chloroform, benzene, aldehydes, trichloroethylene, toluene, chloral, chloroethane and vinyl chloride. Other organic compounds include pesticides, herbicides, algaecides, dioxin, phenols, polychlorinated biphenyls ("PCBs"), hydrogen sulfide, alcohols, ammonia and urea.

Organic compounds are currently removed from drinking water by the use of granulated activated carbon ("GAC") and/or diffused or packed-tower aeration. Although GAC, like other carbonous sorbents, may remove VOCs, it is not effective in removing other harmful contaminants such as hydrogen sulfide and ammonia. It is also well known that activated carbon tends to form densely packed beds, particularly in their finely divided state where they are most efficient. These densely packed beds experience pressure loss, inhibiting the flow of liquid. Thus, it is difficult to utilize GAC in performing continuous filtration of liquid streams. Microbial contaminants also commonly exist in water systems, especially in rural areas, which are without the benefit of chlorination. These contaminants include bacteria, algae, fungi, yeast and viruses. Microbiological contaminants are currently removed with ceramic filters, chemical disinfection or ultraviolet ("UV") irradiation.

With respect to the removal of microbial contaminants, packed beds of sufficiently small particles are helpful in reducing microbial contamination in water. Cholera, for example, was eradicated in New York in the 1800's in part by the institution of sand bed filters throughout the State. Granular sorbent beds may also remove bacteria and algae from water; however, they are much more conducive to biological colonization than sand because of their irregular, jagged surfaces which provide secure, stagnant crevices for microbe attachment and growth. Further, as a result of their sorption of certain other contaminants such as sulfates and humic acid, the granular sorbent beds may also provide nutrients to the attached microbes. The presence of nutrients fosters the biological growth of the microbes. Microbes, such as anaerobic bacteria, in turn, produce sulfide gases. Therefore, using granulated sorbents alone may increase the biological contamination of the water supply as well as the increase the production of undesirable, noxious sulfide gases. Further, utilizing such a filter system would require an additional disinfecting step such as UV irradiation.

Biological growth is retarded in the present invention by the presence of silica hydrogel sorbent. This sorbent creates an acidic condition in its aqueous environs, especially during non-flowing periods. Trace quantities of aluminum ions from the activated alumina sorbent, as well as copper, zinc, brass, manganese and silver, also retard biological growth.

Inorganic contaminants dissolved in water systems include radicals such as chlorine, fluorine, nitrates, sulfates and phosphates as well as metals such as mercury, lead, arsenic, copper, zinc, chromium and iron. Inorganic compounds are usually removed from drinking water through the processes of reverse osmosis ("RO"), deionization ("DI"), distillation, electrodialysis, and crystallization (or freezing).

In the prior art, U.S. Pat. No. 4,238,334, Halbfoster, is directed to a filter bed for removing impurities from liquids, such as removing chlorine from an aqueous suspension, comprising a mixture of treated fibrous filter aid material and an active particulate material. The active particulate material is indicated to be selected from the group consisting of organic polymeric absorbent, zeolite, bentonite, zirconium oxide, zirconium phosphate, activated alumina, ferrous sulfide, activated carbon and diatomaceous earth. No discussion is directed to potable water.

U.S. Pat. No. 4,081,365, Eugene B. White et al., is directed to a method and a apparatus for the treatment of sewage and waste materials in accordance with a specific process. In the process, a regeneration step may be utilized whereby a tertiary treatment apparatus is reactivated through a wet-oxidation process, employing air and water that has been heated to a desired temperature, the water being supplied from a reservoir and then heated. The sorbent bed is described as containing minerals, such as red flint, on top of which is disposed an adsorption layer comprising a hydraulic mix of activated carbon and quartz. The '365 patent indicated that the effluent may conceivably be used as potable water, with the addition of chlorine, clearly indicating, then, that the water is not suitable or potable water in that tertiary treatment. Further, chlorination of water may result in the production of potentially harmful chlorinated hydrocarbons such as chloroform and trihalomethanes ("THMs") by the reaction of chlorine with humic materials.

U.S. Pat. No. 4,661,256, Johnson, is directed to the removal of trace quantities of hydrocarbonaceous compounds from an aqueous stream, by adsorbing hydrocarbon impurities onto a regenerable adsorbent. According to the patent, the aqueous stream is contacted with an adsorbent such as a molecular sieve, amorphous silica-alumina gel, activated carbon, activated alumina, silica gel, or clay. However, no discussion of a use of a mixture of such adsorbents appears in the '256 patent.

Clearly, heretofore there has not existed a single filtration means that is capable of treating water containing any one or more of a variety of contaminants, including organic, inorganic and microbial contaminants, to render said water potable. A device capable of treating such a wide variety of contaminants is especially desirable for use in applications in which the nature of the contaminants and the quantity thereof may vary daily, or hourly, as is true for closed environment water purification applications, as exist for underwater exploration vessels and the like. A similar need also exists for use in point of use filtration in the vicinity of Superfund sites, that may cause the effluent to have any of a wide variety of contaminants, that may frequently change, depending upon subterranean water flow, surface water flow, and the like.

Thus, there exists a need for a device and method that are capable of providing potable water by effectively removing substantially all organic, inorganic and microbial components in a one step process. Such a device should also prevent any increased biological contamination of the water during the filtration process.

SUMMARY OF THE INVENTION

The present invention overcomes the drawbacks associated with prior filtering compositions by providing a new filter composition which, when utilized to treat water, provides potable water which is substantially free of organic, inorganic and microbial contaminants in a one-step process.

The present invention also imparts the desirable filtration characteristics of traditional adsorbents while avoiding increased biological contamination of drinking water during the filtration process.

In general, the present invention is a mixed filter bed composition comprising inorganic and carbonous sorbents which provides potable water by removing inorganic, organic and microbial contaminants from water. The sorbents complement each other in this arrangement.

In one preferred mode, the present invention is a mixed filter bed composition for removing general contaminants from drinking water comprising (a) from about 60% to about 80%, preferably about 70% of carbonous sorbents; (b) from about 5% to about 15%, preferably about 10% of activated alumina; (c) from about 5% to about 15%, preferably about 10% of silica hydrogel; (d) from about 5% to about 15%, preferably about 10% of zeolite; and (e) from about 0% to about 5%, preferably about 0% to about 1%, of metallic components that generate metallic cations, all percentages being based on the total weight of the mixed filter bed.

DETAILED DESCRIPTION OF INVENTION

In general, the present invention is a mixed filter bed comprising inorganic and carbonous sorbents for purifying contaminated water containing inorganic, organic and microbial contaminants from drinking water. The various sorbents complement each other in the filter bed arrangement.

The various classes of sorbents used in the present invention differ in their sorption mechanisms, porosity, and surface activity. For example, carbonous sorbents remove contaminants primarily by chemisorption within the carbon-oxygen functional groups formed on the inner surfaces of the microporous granules. In contrast, the inorganic sorbents such as activated alumina, silica hydrogel, and zeolite remove contaminants primarily by adsorption through the physical attraction of molecules to polar and ionic surfaces by van der Waals forces.

"Van der Waals forces" is a collective term encompassing all of the forces of attraction which include ionic, polar and London dispersion forces. In purely physical adsorption processes, chemical reactions do not occur on the surfaces of the adsorbent, except for the possibility of hydrogen bonding, and the process is reversible without affecting the chemical composition of the adsorbate or permanently affecting the physical structure of the adsorbent.

The following chart illustrates the adsorption efficacy of typical contaminants found in water systems by various classes of sorbents. A rating of "Good" indicates that the particular sorbent is from about 75% to about 100% effective; a rating of "Fair" indicates that the sorbent is from about 25% to about 75% effective and; a rating of "Poor" indicates that the sorbent is from about 0% to about 25% effective in removing a particular contaminant from water.

| Relative Abatement of Some Dissolved Contaminants in Water Systems By Various Classes of Sorbents | | | | | |
|---|---|---|---|---|---|
| | Carbonous | Alumina | Siliceous | Zeolitic | Metallic |
| Organic Compounds | | | | | |
| Hydrocarbons | | | | | |
| Humic acid | Good | Good | Good | Good | Poor |
| Fulvic acid | Good | Good | Good | Good | Poor |
| Tannic acid | Good | Good | Good | Good | Poor |
| Oil | Good | Good | Good | Good | Poor |
| Gasoline | Fair | Fair | Fair | Fair | Poor |
| Kerosine | Fair | Fair | Fair | Fair | Poor |
| Volatile Organic | | | | | |
| Chloroform | Fair | Poor | Poor | Poor | Poor |
| Other THMs | Fair | Poor | Poor | Poor | Poor |
| Benzene | Fair | Poor | Poor | Poor | Poor |
| Aldehydes | Fair | Poor | Poor | Poor | Poor |
| Trichloroethylene | Fair | Poor | Poor | Poor | Poor |
| Toluene | Fair | Poor | Poor | Poor | Poor |
| Chloral | Fair | Poor | Poor | Poor | Poor |
| Chloroethane | Fair | Poor | Poor | Poor | Poor |
| Vinyl Chloride | Fair | Poor | Poor | Poor | Poor |
| Other Chemicals | | | | | |
| Compounds | | | | | |
| Pesticides | Fair | Good | Good | Good | Poor |
| Herbicides | Fair | Good | Good | Good | Poor |
| Algaecides | Fair | Good | Good | Good | Poor |
| Dioxin | Fair | Good | Good | Good | Poor |
| Phenols | Fair | Good | Good | Good | Poor |
| PCBs | Fair | Good | Good | Good | Poor |
| Hydrogen Sulfide | Poor | Poor | Poor | Poor | Good |

-continued

| Relative Abatement of Some Dissolved Contaminants in Water Systems By Various Classes of Sorbents | | | | | |
|---|---|---|---|---|---|
| | Carbonous | Alumina | Siliceous | Zeolitic | Metallic |
| Alcohols | Poor | Fair | Good | Good | Poor |
| Ammonia | Poor | Fair | Good | Good | Poor |
| Urea | Poor | Fair | Good | Good | Poor |
| Radicals | | | | | |
| Chlorine | Fair | Good | Poor | Good | Fair |
| Fluorine | Fair | Good | Poor | Good | Fair |
| Nitrates | Fair | Good | Good | Good | Poor |
| Sulfates | Fair | Good | Good | Good | Poor |
| Phosphates | Fair | Good | Good | Good | Poor |
| Minerals | | | | | |
| Metals | | | | | |
| Mercury | Fair | Good | Good | Good | Fair |
| Lead | Fair | Good | Good | Good | Fair |
| Arsenic | Fair | Good | Good | Good | Fair |
| Copper | Fair | Good | Good | Good | Fair |
| Zinc | Fair | Good | Good | Good | Fair |
| Chromium | Fair | Good | Good | Good | Fair |
| Iron | Fair | Good | Good | Good | Fair |

In one preferred mode, the present invention is a mixed filter bed composition for removing general contaminants from potable water said composition comprising (a) from about 60% to about 80%, preferably about 70% of carbonous sorbents; (b) from about 5% to about 15%, preferably about 10% of activated alumina; (c) from about 5% to about 15%, preferably about 10% of silica hydrogel; (d) from about 5% to about 15%, preferably 10% of zeolite; and (e) from about 0% to about 5%, preferably about 0% to about 1%, of metallic components that generate metallic cations. All percentages expressed in this application are percentages by weight unless otherwise indicated.

In another preferred mode, the present invention is a mixed filter bed composition for removing general contaminants as well as biological contaminants from potable water supplies, said composition comprising (a) from about 50% to about 70%, preferably about 60% of carbonous sorbent; (b) from about 5% to about 15%, preferably about 10% of activated alumina; (c) from about 10% to about 20%, preferably about 15% of silica hydrogel; (d) from about 5% to about 15%, preferably about 10% of zeolite; and (e) from about 0% to about 10%, preferably about 5% of metallic components that generate metallic cations.

In an additional preferred mode, the present invention is a mixed filter bed composition for removing chemical contaminants as well as general contaminants and biological contaminants from nonpotable water supply, said composition comprising (a) from about 40% to about 60%, preferably about 50% of carbonous sorbent; (b) from about 10% to about 20%, preferably about 15% of activated alumina; (c) from about 10% to about 20%, preferably about 15% of silica hydrogel; (d) from about 10% to about 20%, preferably about 15% of zeolite; and (e) from about 0% to about 10%, preferably about 5% of metallic components that generate metallic cations.

Carbonous sorbents typically employed in the present invention include coal base, fruit shells such as coconut shell, wood base, petroleum base activated carbons, synthetic carbons and mixtures thereof. Some carbonous sorbents are activated in steam, and others in inert gas. The temperature and duration of exposure significantly affect the adsorbent properties of activated carbon.

The metallic components employed in the present invention include copper, zinc, brass, manganese, silver and mixtures thereof.

The granule sizes of adsorbents and components chosen for mixed filter bed compositions of the present invention are generally in the range of one half to five millimeters. This size range represents a compromise between the unwanted pressure loss characteristics and the desired transfer properties of packed beds. Smaller size particles yield greater transfer rates, but the pressure losses can become excessive.

In order to obtain useful granule sizes, adsorbents are either granulated or agglomerated in the manufacturing process. Carbons are usually milled and sieved prior to activation in order to obtain the desired granule sizes, and silica hydrogel granules are produced by crushing and sieving. Activated alumina and zeolite, which are generally produced in the size range of 3 to 7$\mu$, are often beaded or pelletized to yield larger size granules.

Beaded granules of adsorbents are preferred because they provide better mass transfer rates than irregular shaped granules for equal pressure loss conditions. Irregular shaped granules form non-flow cavities and dead end pockets within packed beds which increase the resistance to both flow and to transfer processes. Similarly, a narrow distribution of granule sizes is preferred because it yields better transfer rates than a wide distribution for the same pressure loss condition. In wide distribution beds, smaller granules tend to block some of the passages between the larger granules creating stagnant pockets or "ineffective void spaces". These ineffective void spaces decrease the mass transfer rate and increase the flow resistance.

A primary feature of an adsorbent is its capacity for removing the contaminants throughout their ranges of concentration from the influent condition to the desired effluent condition. The capacity of an adsorbent for removing contaminants is dependent upon its porosity and surface activity. These characteristics may be calculated according to the methods described in D. White, "Regenerable Pressure-Swing Adsorption Systems For Continuous Chemical Warfare Collection Protection", Presented to the Naval Research Laboratory, Washington, D.C., 1986, pp. 10-17.

The porosity of an adsorbent particle is described by its interstitial void volume, its pore size distribution and stericity, and its internal surface area. The surface activity is defined by the effectiveness of the adsorbent surfaces to attract and hold contaminant molecules. The maximum capacity of an adsorbent particle is determined by the total interstitial void volume. In the present invention, the various absorbents should possess interstitial void volumes in the following ranges:

Carbon (Activated Carbon): 0.60 to 0.80 cm$^3$/g
Silica Hydrogel: 0.30 to 0.50 cm$^3$/g
Activated Alumina: 0.30 to 0.50 cm$^3$/g
Zeolite: 0.14 to 0.36 cm$^3$/g Typical pore volumes for carbonous, silicious and alumina adsorbents can be found in *Industrial Gas Cleaning*, by W. Strauss, page 108, Table 3.7. The pore volumes for zeolite are provided in Table 1 of "Crystalline Molecular Sieves" by D. W. Breck.

Pore sizes and surface activity affect the strength of the attractive forces for the contaminant molecules. Small pores enhance the attraction as the intruding molecules are affected by forces emanating from all sides of the pore. Polar molecules and ionic bonds on the surface of the adsorbent also enhance the attraction. While all surfaces exhibit some degree of adsorption strength, those of metallic oxide and those with oxygen complexes formed on their surfaces possess a higher degree of attraction.

The porosity and surface activity in porous adsorbents may be determined by various techniques such as mercury porosimetry, B.E.T., nitrogen adsorption, static and dynamic adsorption test stands, calorimetry, nuclear magnetic resonance spectroscopy, and electron microscopy are useful methods for both quantitative and qualitative evaluation of adsorption phenomena.

The contaminated water to be treated with the present invention is contacted with the sorbents in an adsorption zone. The sorbents may be installed in the adsorption zone in any suitable manner. A preferred method for the installation of the sorbents is a mixed sorbent fixed bed arrangement. A further preferred method of installation of the sorbents is the layering of the sorbents in a fixed bed arrangement. The order of layers of sorbents is not essential as long as there exists an effective amount of each sorbent to effectively remove the contaminants from the water.

Problems commonly associated with packed filter bed systems include fluidization and attrition. As the granules in normal packed beds are not rigidly interlocked, the application of force to the end of the bed either with crating or compressed fiber pads is insufficient to prevent attrition. Loose granules within the bed loaded by pressure are free to vibrate and abrade neighboring wedged granules. Fluidization and attrition can be overcome in the present invention by immobilizing the adsorbent thereby impeding granular movement.

A preferred method of immobilizing adsorbent granules is by the application of a binder throughout the bed to physically interlock all of the granules into one common mass. Such immobilization allows for the design of adsorbent beds with much higher velocities and higher heat and mass transfer rates which are desirable features. The unwanted increase in differential pressure resulting from immobilization of the granules can be compensated by the use of shallow beds of larger diameter.

Shallow bed designs are hampered by uneven flow distribution and by edge effects which can result in premature transfer front breakthroughs. Such beds must be carefully designed and constructed to overcome these tendencies. The flow distribution in such beds can be made more uniform by baffling to reduce edge effects and by using graded perforated support screens containing fewer or smaller perforations in the high velocity regions. This will produce a higher differential pressure in these regions and reduce the velocity locally. Such modifications can greatly extend the adsorbent bed life and useful capacity.

In both the mixed and layered filter bed arrangements, the adsorbent may be installed in one or more vessels and either in series or parallel flow duplex. The flow of contaminated water through the adsorption zone is preferably performed in a parallel manner so that when one of the adsorbent beds or chambers is spent by the accumulation of contaminants thereon, the spent adsorbent zone is bypassed while continuing uninterrupted operation through the parallel adsorption zone.

The potential for biological growth in filter compositions is also significantly reduced in the present invention. Specifically, silica hydrogel sorbent produces an acidic condition in its aqueous environs, especially during non-flowing periods. In addition, trace quantities of aluminum ions, existing in the filter composition due to the presence of activated alumina in the filter bed composition, also aid in biostasis. Further, metal additives such as copper, zinc, brass, manganese and silver are recommended in the sorbent mixture for water filter applications requiring greater biological protection.

Biological growth retardation and biological destruction afforded by the presence of metal ions in the present invention is a result of an electrochemical reaction within the plasma membrane of living cells. The continuing life of a microbial cell is dependent upon the transportation of nutrients and by-products of metabolism ("excreta") through the surface of microorganisms, known as the plasma membrane. The plasma membrane is selectively permeable and contains proteins capable of transporting certain nutrients into the cell and excreta out of the cell.

Metal ions in water are attracted to the plasma membrane by van der Waals forces. Each particular type of microbial cell has a certain capacity for a specific metal ion. If a microbial cell's capacity for the specific metal ion is already satisfied, the cell rejects the approaching ion by establishing a polarized surface in the region around the metal ion. Polarization is accomplished by an outward shift of negative ions, principally chlorine ions, and an inward shift of positive ions, primarily potassium ions, from the microbial cell.

The plasma membrane in the polarized region becomes non-permeable, inhibiting the transport of nutrients into a cell as well as restricting the transport of excreta out of a cell. As a result, there is a decrease in the microbial cell's metabolism and growth.

The decrease in metabolism and growth of a microbial cell is largely dependent upon the quantity of metal ions present in the cell's environs and the percentage of plasma membrane surface polarized. If a sufficient amount of metal ions are present, lethal levels of excreta may accumulate in a cell's cytoplasm within a few hours.

The number of metal ions required to destroy a microbial cell is dependent upon the specific type of organism and the type of metal ion. For example, covering as little as 1/10,000th of the total surface of a yeast cell with silver ions is sufficient to cause cell destruction. In addition, fewer arsenic ions than silver ions are required to destroy a yeast cell.

The amount of metal ions used in the filter bed composition of the present invention must be carefully maintained. While humans require trace quantities of metal ions for normal bodily functions, extremely large amounts may cause cell destruction in the same manner as microbes are destroyed. This cell destruction leads to impaired health and possibly death.

Typically, the human body disposes of excess metal ions in urine, excretion, bile, perspiration and hair growth. The rate of removal depends upon the specific metal ion. For example, lead and arsenic are disposed of very slowly from the human body.

If the removal process becomes overwhelmed, the excess metal ions cause the malfunction and possible destruction of human cells. For instance, it is well known that lead affects the cells in the central nervous system, potentially resulting in mental retardation. In addition, the walls of the small intestine may be damaged by exposure to extreme amounts of zinc and copper.

In the mixed filter bed composition of the present invention, excess metal ions at levels of concern to human health are adsorbed by the inorganic sorbents. Inorganic sorbents such as activated alumina and zeolite attract and hold metal ions on their internal surfaces by van der Waals forces.

As a practical matter, the metal ions produced by the metal particles passing through the water in the sorbent bed, associate with the plasma membrane of microbial cells in the sorbent bed. Metal ions attach themselves to the adsorbent surfaces of the inorganic sorbents.

The present invention is further described in terms of the following nonlimiting examples. Application "A" is for the typical drinking water filter used on deep well or city water supply systems application B is suggested for a rural water supply system which commonly contains biological contamination. Application "C" is for gray water systems such as for gallery and wash water drains on board many vessels.

|  | A | B | C |
| --- | --- | --- | --- |
| Gallonage Rating | 200 gal | 200 gal | 223.300 gal |
| Flowrate | ½ gpm | ½ gpm | 5 gpm |
| Service | Continual | Continual | Continuous |
| Supply Water | Potable | Potable (Surface water) w/microbe contamination | Non-potable Gray Water |
| Adsorbent Volume | .00875 Ft$^3$ | .00875 Ft$^3$ | 9.80 Ft$^3$ |
| Total Ads. Wt. | 139.2 grams | 149.0 grams | 381 lbs |
| Carbon Wt. | 97.5 grams | 89.4 grams | 190.5 lbs |
| Alumina Wt. | 13.9 grams | 14.9 grams | 57.1 lbs |
| Silica Wt. | 13.9 grams | 22.3 grams | 57.1 lbs |
| Zeolite Wt. | 13.9 grams | 14.9 grams | 57.1 lbs |
| Metal Wt. | 0 grams | 7.5 grams | 19.1 lbs |
| % by Wt. |  |  |  |
| Carbon | 70% | 60% | 50% |
| Alumina | 10% | 10% | 15% |
| Silica | 10% | 15% | 15% |
| Zeolite | 10% | 10% | 15% |
| Metal | 0% | 5% | 5% |

What is claimed is:

1. A mixed filter bed composition for purifying water for human consumption comprising:
   (a) from about 40% to about 80% by weight of carbonous sorbent;
   (b) from about 5% to about 20% by weight of activated alumina;
   (c) from about 5% to about 20% by weight of silica hydrogel;
   (d) from about 5% to about 20% by weight of zeolite; and
   (e) from greater than 0% to about 10% by weight of metallic components that generate metallic cations.

2. The mixed filter bed composition as claimed in claim 1, wherein the metallic components are a selected from the group consisting of copper, zinc, brass, manganese, silver and mixtures thereof.

3. A mixed filter bed composition for removing general contaminants from water comprising:
   (a) about 70% by weight of carbonous sorbents;
   (b) about 10% by weight of activated alumina;
   (c) about 10% by weight of silica hydrogel;
   (d) about 10% by weight of zeolite; and
   (e) from greater than 0% to about 1% by weight of metallic components that generate metallic cations.

4. The mixed filter bed compositions as claimed in claim 3, wherein the metallic components are selected from the group consisting of copper, zinc, brass, manganese, silver and mixtures thereof.

5. A mixed filter bed composition for removing biological contaminants from water comprising:
   (a) about 60% by weight of carbonous sorbents;
   (b) about 10% by weight of activated alumina;
   (c) about 15% by weight of silica hydrogel;
   (d) about 10% by weight of zeolite; and
   (e) about 5% by weight of metallic components that generate metallic cations.

6. A mixed filter bed composition for removing chemical contaminants from drinking water comprising:
   (a) about 50% by weight of carbonous sorbents;
   (b) about 15% by weight of activated alumina;
   (c) about 15% by weight of silica hydrogel;
   (d) about 15% by weight of zeolite; and
   (e) about 5% by weight of metallic components that generate metallic cations.

7. A method for purifying contaminated water containing organic, inorganic and microbiological contaminants, said method comprising:
   (1) placing a filter composition in a mixed filter bed arrangement said composition comprising:
      (a) from about 40% to about 80% by weight of carbonous sorbent;
      (b) from about 5% to about 20% by weight of activated alumina;
      (c) from about 5% to about 20% by weight of silica hydrogel;
      (d) from about 5% to about 20% by weight of zeolite; and
      (e) from greater than 0% to about 10% by weight of metallic components that generate metallic cations; and
   (2) contacting water to be treated with said filter composition in an adsorption zone.

8. The method of producing potable water as claimed in claim 7, wherein the metallic component that generates metallic cations is selected from the group consisting of copper, zinc, brass, manganese, silver and mixtures thereof.

* * * * *